(12) United States Patent
Yoshikawa et al.

(10) Patent No.: US 9,375,673 B2
(45) Date of Patent: Jun. 28, 2016

(54) $CO_2$ SEPARATION UNIT

(71) Applicant: Hitachi, Ltd., Chiyoda-ku, Tokyo (JP)

(72) Inventors: Kohei Yoshikawa, Tokyo (JP); Hiroki Sato, Tokyo (JP); Masato Kaneeda, Tokyo (JP); Shuichi Kanno, Tokyo (JP); Hisayuki Orita, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 58 days.

(21) Appl. No.: 14/370,856

(22) PCT Filed: Jan. 15, 2013

(86) PCT No.: PCT/JP2013/050512
§ 371 (c)(1),
(2) Date: Jul. 7, 2014

(87) PCT Pub. No.: WO2013/108732
PCT Pub. Date: Jul. 25, 2013

(65) Prior Publication Data
US 2015/0013543 A1 Jan. 15, 2015

(30) Foreign Application Priority Data
Jan. 20, 2012 (JP) .................................. 2012-009579

(51) Int. Cl.
*B01D 53/04* (2006.01)

(52) U.S. Cl.
CPC ............ *B01D 53/0462* (2013.01); *B01D 53/04* (2013.01); *B01D 2257/504* (2013.01);
(Continued)

(58) Field of Classification Search
CPC ............... B01D 53/04; B01D 53/0462; B01D 2257/504; B01D 2259/4009; B01D 2259/404; Y02C 10/06; Y02C 10/08; Y02C 20/10

USPC ............................ 96/145; 95/95–97, 104, 139
See application file for complete search history.

(56) References Cited

U.S. PATENT DOCUMENTS

| 3,594,983 A | * | 7/1971 | Yearout | ................ | B01D 53/047 |
| | | | | | 95/122 |
| 3,729,902 A | * | 5/1973 | Ventriglio | .............. | B01D 53/04 |
| | | | | | 96/127 |

(Continued)

FOREIGN PATENT DOCUMENTS

| EP | 0 289 446 B1 | 1/1994 |
| EP | 2 815 799 A1 | 12/2014 |

(Continued)

OTHER PUBLICATIONS

Corresponding International Search Report dated Apr. 16, 2013 with English Translation (nine (9) pages).

(Continued)

Primary Examiner — Frank Lawrence
(74) Attorney, Agent, or Firm — Crowell & Moring LLP

(57) ABSTRACT

A $CO_2$ separation unit for recovering $CO_2$ from a $CO_2$-containing gas by using a solid $CO_2$ capturing material, in which the amount of used steam is decreased: the unit comprising a capturing material container, a first pipeline for allowing the $CO_2$-containing gas to flow therethrough into the capturing material container, a second pipeline for allowing a gas from which $CO_2$ has been removed to be discharged therethrough, a third pipeline for introducing a steam-containing gas to the inside of the capturing material container, a fourth pipeline for allowing a desorbed $CO_2$-containing gas to be discharged therethrough, wherein the unit further includes a compressor for compressing steam, a fifth pipeline for connecting the capturing material container with a suction port of the compressor, and a sixth pipeline for connecting a discharge port of the compressor with the third pipeline.

7 Claims, 8 Drawing Sheets

(52) U.S. Cl.
CPC ... *B01D2259/404* (2013.01); *B01D 2259/4009* (2013.01); *Y02C 10/06* (2013.01); *Y02C 10/08* (2013.01); *Y02C 20/10* (2013.01)

(56) References Cited

U.S. PATENT DOCUMENTS

| | | | |
|---|---|---|---|
| 4,522,793 A | | 6/1985 | Larson et al. |
| 4,822,383 A | | 4/1989 | Brose et al. |
| 5,792,239 A | | 8/1998 | Reinhold, III et al. |
| 6,322,612 B1 * | | 11/2001 | Sircar .................. B01D 53/047 95/104 |
| 2003/0037672 A1 | | 2/2003 | Sircar |
| 2015/0013543 A1 | | 1/2015 | Yoshikawa et al. |

FOREIGN PATENT DOCUMENTS

| | | |
|---|---|---|
| GB | 2 013 519 A | 8/1979 |
| JP | 60-153919 A | 8/1985 |
| JP | 61-167919 U | 10/1986 |
| JP | 63-294923 A | 12/1988 |
| JP | 8-40715 A | 2/1996 |
| JP | 2003-175311 A | 6/2003 |
| JP | 2004-344703 A | 12/2004 |
| JP | 2010-69398 A | 4/2010 |
| JP | 2013-147386 A | 8/2013 |
| WO | WO 2013/108732 A1 | 7/2013 |

OTHER PUBLICATIONS

Japanese Office Action issued in counterpart Japanese Application No. 2012-009579 dated Aug. 4, 2015 with English translation (12 pages).

Canadian Office Action issued in counterpart Canadian Application No. 2,858,307 dated Sep. 15, 2015 (six pages).

Extended European Search Report issued in counterpart European Application No. 13738828.6 dated Jul. 13, 2015 (Seven (7) pages).

* cited by examiner

Prior Art

Prior Art

$CO_2$ SEPARATION UNIT

TECHNICAL FIELD

The present invention relates to a $CO_2$ separation unit for recovering $CO_2$ from a $CO_2$-containing gas by using a $CO_2$ capturing material.

BACKGROUND ART

Global warming caused by emission of greenhouse gases has become a worldwide problem. The greenhouse gas includes carbon dioxide ($CO_2$), methane ($CH_4$), freons (CFCs), etc. Among them, $CO_2$ has the most significant effect on global warming and reduction of $CO_2$ emission is an urgent subject. Methods of separating and recovering $CO_2$ for decreasing the amount of $CO_2$ emissions include, for example, a chemical absorption method, a physical absorption method, a film separation method, a capturing and separation method, and a cryogenic separation method. Further, the method of separating and recovering $CO_2$ includes, for example, a $CO_2$ capturing and separation method using a solid $CO_2$ capturing material.

In a $CO_2$ separation unit using a $CO_2$ capturing material, a gas containing $CO_2$ ($CO_2$-containing gas) is introduced into a capturing material container filled with the $CO_2$ capturing material, and the $CO_2$-containing gas are brought into contact with the $CO_2$ capturing material to capture and remove $CO_2$ by the $CO_2$ capturing material. Subsequently, captured $CO_2$ is desorbed and recovered by heating the $CO_2$ capturing material. An example of the $CO_2$ separation and recovery method is described in Patent Literature 1.

The method of heating the $CO_2$ capturing material to desorb $CO_2$ and regenerate the $CO_2$ capturing material includes a method of bringing a heated gas directly into contact with a $CO_2$ capturing material and heating the material, and a method of indirectly heating the $CO_2$ capturing material by causing a heated gas to flow through a heat conduction pipe. As the heated gas, steam is utilized. However, when steam is used, since energy necessary for separation and recovery of $CO_2$ is increased, the amount of used steam is preferably smaller. The method of decreasing the amount of the used steam includes improvement of the heating method and reutilization of the steam used.

The method of heating the $CO_2$ capturing material includes the techniques described, for example, in Patent Literature 2 and Patent Literature 3. In the technique described in the Patent Literature 2, an adsorption step, a regeneration step and a cooling step are performed successively by rotating a drum-shaped $CO_2$ capturing material using zeolite as a starting material. In this system, the $CO_2$ capturing material is heated during regeneration by a high temperature $CO_2$ circulating to desorb $CO_2$. Further, in the technique described in the Patent Literature 3, after capturing $CO_2$ by using a $CO_2$ capturing material comprising activated carbon with addition of potassium carbonate and sodium carbonate, $CO_2$ is desorbed by direct contact of steam with the $CO_2$ capturing material.

PRIOR ART LITERATURE

Patent Literature

Patent Literature 1 JP-2010-69398-A
Patent Literature 2 JP-2004-344703-A
Patent Literature 3 JP-8(1996)-40715-A

SUMMARY OF THE INVENTION

Problem to be Solved by the Invention

In the $CO_2$ separation and recovery method of heating the $CO_2$ capturing material by utilizing circulation of high temperature $CO_2$, which is described in Patent Literature 2, since the heat capacity of the $CO_2$ gas is smaller compared with that of the $CO_2$ capturing material, the volume of $CO_2$ necessary for heating is large to consume much electric power for gas flowing. Further, in the $CO_2$ separation and recovery method described in Patent Literature 3 of heating the $CO_2$ capturing material by the flow of the steam, reduction in amount of the steam used for the heating is not taken into consideration.

Means for Solving the Problem

The present invention has been accomplished in view of the foregoing subjects and intends to decrease the amount of steam used in a $CO_2$ separation unit for recovering $CO_2$ from a $CO_2$-containing gas by using a solid $CO_2$ capturing material.

For solving the subjects described above, the $CO_2$ separation unit according to the invention has the following features.

The unit for recovering $CO_2$ from a $CO_2$ containing gas includes a capturing material container having a $CO_2$ capturing material for capturing $CO_2$, a first pipeline for allowing the $CO_2$-containing gas to flow therethrough into a capturing material container, a second pipeline for allowing a gas from which $CO_2$ has been removed by the $CO_2$ capturing material to be discharged therethrough from the capturing material container, a third pipeline for introducing a steam-containing gas to the inside of the capturing material container, and a fourth pipeline for allowing a desorbed $CO_2$-containing gas desorbed from the $CO_2$ capturing material, while the steam-containing gas flows in the container, to be discharged therethrough from the capturing material container. The unit further comprises a compressor for compressing steam, a fifth pipeline connecting the capturing material container with a suction portion of the compressor, and a sixth pipeline for connecting a discharge port of the compressor with the third pipeline.

Effects of the Invention

In the $CO_2$ separation unit according to the invention, the amount of used steam can be decreased compared with the existent $CO_2$ separation unit. Accordingly, the energy required for separation and recovery of $CO_2$ can be decreased.

MODE FOR CARRYING OUT THE INVENTION

Figure 1:
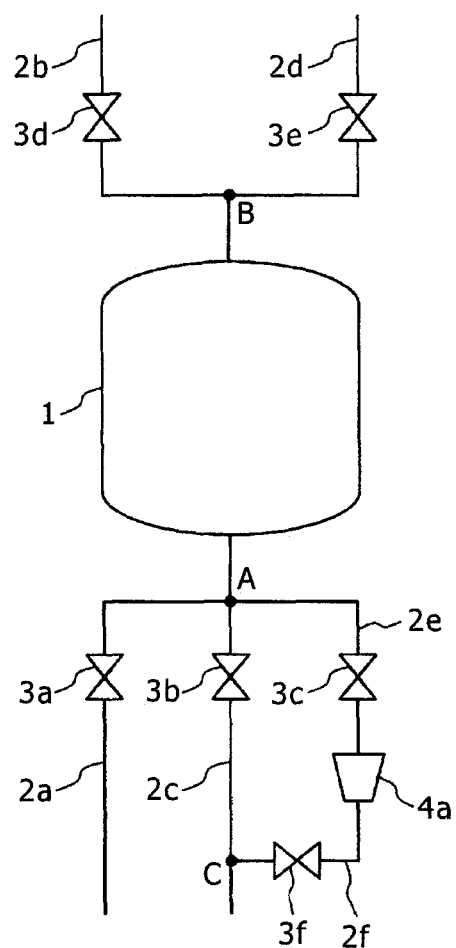
FIG. 1 is a view illustrating a configurational example of a $CO_2$ separation unit according to Example 1.

As a result of an earnest study on the subject described above, the present inventors have found that the amount of the used steam can be decreased in a $CO_2$ separation unit for recovering $CO_2$ from a $CO_2$ containing gas. The unit includes a capturing material container having a $CO_2$ capturing material for capturing $CO_2$, a first pipeline for allowing the $CO_2$-containing gas to flow therethrough into the capturing material container, a second pipeline for allowing a gas from which $CO_2$ has been removed by the $CO_2$ capturing material to be discharged therethrough from the capturing material container, a third pipeline for introducing a steam-containing gas to the inside of the capturing material container, and a fourth pipeline for allowing a desorbed $CO_2$-containing gas desorbed from the $CO_2$ capturing material, while the steam-containing gas flows in the container, to be discharged therethrough from the capturing material container. The unit further includes a compressor for compressing steam, a fifth pipeline for connecting the capturing material container with a suction port of the compressor and a sixth pipeline for connecting a discharge port of the compressor with the third pipeline. The reason why the amount of the used steam can be decreased is that steam not reutilized in the existent $CO_2$ separation unit are reutilized in the $CO_2$ separation unit according to the invention. Further, since sensible heat of the $CO_2$ capturing material is utilized for vaporization of condensed water, cooling of the $CO_2$ capturing material can be promoted.

In the $CO_2$ separation unit according to the invention, condensation of the steam when the $CO_2$ capturing material is heated by the steam is utilized. The condensed water generates saturated steam at a pressure depending on the temperature. Then, saturated steam is generated from condensed water by depressurizing the inside of the capturing material container, the saturated steam is discharged out of the capturing material container and then heated steam is generated by compressing the saturated steam. The generated heated steam is reutilized for heating of the $CO_2$ capturing material. Thus, the amount of the used steam can be decreased more than that of the existent $CO_2$ separation unit.

Heating method of the $CO_2$ capturing material includes a method of direct contact of steam with a $CO_2$ capturing material, a method of causing steam to flow into a heat conduction pipe disposed inside of a capturing material container and utilizing the heat conduction pipe heated by the steam, and a combined method of using the two methods together. The method of direct contact of the steam with the $CO_2$ capturing material has an advantage that the heating speed is fast. However, when the $CO_2$ capturing performance of the $CO_2$ capturing material is lowered because of the contact with the steam, direct contact between the steam and the $CO_2$ capturing material is preferably avoided by utilizing the heat conduction pipe.

Since the desorbed $CO_2$-containing gas generated from the $CO_2$ capturing material upon heating of the $CO_2$ capturing material contains steam, condensed water is generated upon cooling. By sending the condensed water to a flasher container and reducing the pressure, steam can be obtained. By pressurizing the steam and using them as a steam-containing gas for heating the $CO_2$ capturing material, the amount of the used steam can be decreased further.

When the $CO_2$ concentration of the desorbed $CO_2$-containing gas is low, purity of the recovered $CO_2$ is preferably increased by causing a $CO_2$-containing gas at a high concentration of 90 volt or more to flow into the capturing material container after capturing $CO_2$ and discharging an impurity gas such as $N_2$ and $O_2$ remaining inside the capturing material container out of the capturing material container.

In this case, when a $CO_2$-containing gas at a high concentration is additionally supplemented from the outside of the $CO_2$ separation unit, this needs an additional cost. Accordingly, a gas after removing the steam, which is obtained in a condenser, is used preferably as the $CO_2$-containing gas at a high concentration.

When the inside of the capturing material container is depressurized, since water condensed in the capturing material container is evaporated by depriving the sensible heat of the $CO_2$ capturing material, the $CO_2$ capturing material is cooled. If cooling is insufficient upon depressurizing of the inside of the capturing material container, a cooling gas is preferably caused to flow into the capturing material container. An example of the cooling gas includes an atmospheric air. In a case where the humidity of an atmospheric air is high and the capturing performance of the $CO_2$ capturing material is deteriorated by the flow, a gas after removing $CO_2$ discharged upon $CO_2$ capturing is preferably caused to flow instead of the atmospheric air. For decreasing desorption occurring upon capture of $CO_2$, temperature of the $CO_2$ capturing material is preferably lowered. However, lowering the capturing temperature to lower than the external air temperature needs a cooling power. Accordingly, the temperature of the $CO_2$ capturing material is preferably from 20 to 70° C.

When $CO_2$ is recovered continuously from the $CO_2$-containing gas, a plurality of capturing material containers are used and the system may be operated such that at least one capturing material container captures $CO_2$.

The solid $CO_2$ capturing material used for the $CO_2$ separation unit includes oxides or carbonates, which contains alkali metals such as Na and K, oxides or carbonates, which contains alkaline earth metals such as Mg, Ba, and Ca, oxides or carbonates, which contains rare earth metals such as Ce, Y, and lanthanoids, zeolite, activated carbon, porous complexes, and solid amines. Since steam is contained in the gas caused to flow into the capturing material container during $CO_2$ capturing, a $CO_2$ capturing material with less lowering of the capturing performance in a steam atmosphere is preferred. For the $CO_2$ capturing material, a single component may be used alone or two or more components may be used in admixture.

It may suffice that the temperature of the steam containing gas caused to flow for heating the $CO_2$ capturing material is higher than that of the $CO_2$ capturing material in the capturing step. While use of high temperature steam facilitates heating, the amount of consumed energy is increased because of the use of the steam. Among the $CO_2$ capturing materials described above, since Mg oxides, Ce oxides, zeolite, solid amines, etc. can desorb $CO_2$ at about 200° C., the temperature of the steam-containing gas is preferably 100° C. or higher and 200° C. or lower. In this case, the pressure of the steam-containing gas may be 1.0 atm or higher and 15.6 atm or lower. For heating the $CO_2$ capturing material by the heat of condensation of the steam, use of a steam-containing gas pressurized as far as the saturation steam pressure at the temperature of the steam-containing gas is preferably used.

As examples of the $CO_2$-containing gas, exhaust gases from coal fired boilers, steel works and cement plants may be considered.

For the $CO_2$ separation unit of the invention, any gas may be used as the $CO_2$-containing gas. Gas components existent together with $CO_2$ include $O_2$, $N_2$, steam, $NO_x$, $SO_x$, etc. The content of acidic gases other than $CO_2$ is preferably lower in order to suppress poisoning of the $CO_2$ capturing material. From this view point, a nitration device and the desulfurization device may be provided preferably at the preceding port of the capturing material container. Further, for preventing dusts and ashes from depositing to the $CO_2$ capturing material, a dust collector is preferably provided.

Preferred embodiments of the invention are to be described with reference to the drawings.

Example 1

FIG. 1 is a view illustrating a configurational example of a $CO_2$ separation unit according to Example 1 of the invention. The unit has a capturing material container 1 in which a $CO_2$ capturing material is filled, a pipeline 2a for causing a $CO_2$-containing gas to flow into the capturing material container 1, a pipeline 2b for allowing a gas from which $CO_2$ has been removed to be discharged therethrough from the capturing material container 1, a pipeline 2c for causing a steam-containing gas to flow into the inside of the capturing material container 1, a pipeline 2d for allowing a desorbed $CO_2$-containing gas desorbed from the $CO_2$ capturing material, while the steam-containing gas flows in the container, to be discharged therethrough from the capturing material container 1, a compressor 4a for compressing the steam, a pipeline 2e for connecting the capturing material container 1 with a suction port of the compressor 4a, a pipeline 2f for connecting a discharge port of the compressor 4a with the pipeline 2c, and a valve 3a to a valve 3f for controlling the flow rate and the pressure of gases.

The space inside the pipeline 2c and the space inside the capturing material container 1 connect with each other and the steam-containing gas introduced from the pipeline 2c are in direct contact with the $CO_2$ capturing material inside the capturing material container 1.

The compressor 4a compresses steam introduced from the pipeline 2e and heats and pressurizes the steam to a temperature and a pressure necessary for desorbing $CO_2$ from the $CO_2$ capturing material.

The valves 3a to 3f intervene in the pipeline 2a, the pipeline 2c, the pipeline 2e, the pipeline 2b, the pipeline 2d, and the pipeline 2f respectively.

In FIG. 1, the pipeline 2a, the pipeline 2c, and the pipeline 2e are joined or branched at a relay point A. The pipeline 2b and the pipeline 2d are joined or branched at a relay point B. That is, the pipeline 2a, the pipeline 2c, and the pipeline 2e have a pipeline provided between the relay point A and the capturing material container 1 in common with each other and the pipeline 2b and the pipeline 2d have the pipelines provided between the capturing material container 1 and the relay point B in common with each other. Exclusive pipelines may be provided for the pipeline 2a, the pipeline 2c, and the pipeline 2e respectively between the relay point A and the capturing material container 1. Exclusive pipelines may be provided for the pipeline 2b and the pipeline 2d respectively between the capturing material container 1 and the relay point B. The pipeline 2f is joined to the pipeline 2c at a relay point C.

When $CO_2$ of the $CO_2$-containing gas is captured by the $CO_2$ capturing material of the unit, a $CO_2$-containing gas is introduced from the pipeline 2a by way of the valve 3a to the capturing material container 1 while opening the valve 3a and the valve 3d and closing the valve 3b, the valve 3c, the valve 3e, and the valve 3f. The $CO_2$ capturing material filled in the capturing material container 1 captures $CO_2$ and removes $CO_2$ from the $CO_2$-containing gas. The gas from which $CO_2$ has been removed in the capturing material container 1 is discharged by way of the valve 3d to the pipeline 2b.

When $CO_2$ is desorbed from the $CO_2$ capturing material that has captured $CO_2$, the valve 3b and the valve 3e are opened, while the valve 3a, the valve 3c, the valve 3d, and the valve 3f are closed. A steam-containing gas is introduced from the pipeline 2c by way of the valve 3b to the inside of the capturing material container 1 to heat the $CO_2$ capturing material. The $CO_2$ capturing material heated by the steam-containing gas desorbs the $CO_2$ in the inside of the capturing container 1. A desorbed $CO_2$-containing gas containing $CO_2$ desorbed from the $CO_2$ capturing material is discharged from the capturing container 1 by way of the valve 3e to the pipeline 2d.

Condensed water remains in the inside of the capturing material container 1 after introducing the steam-containing gas. Then, when the condensed water is reutilized as the steam-containing gas, the valve 3c and the valve 3f are opened, while the valve 3a, the valve 3b, the valve 3d, and the valve 3e are closed, the inside of the capturing material container 1 is depressurized and water in the inside is evaporated into steam. The evaporated steam is introduced from the pipeline 2e by way of the valve 3c into the compressor 4a and compressed therein, and heated and pressurized to a temperature and a pressure necessary for desorbing $CO_2$ from the $CO_2$ capturing material. The thus compressed steam is introduced as a steam-containing gas by way of the pipeline 2f and the valve 3f into the pipeline 2c.

In the $CO_2$ separation unit according to this example, since a portion of the used steam is reutilized, the amount of the steam to be used can be decreased. Further, since the steam is brought into direct contact with the $CO_2$ capturing material, the unit has an advantage that the heating speed is fast.

Example 2

Figure 2:
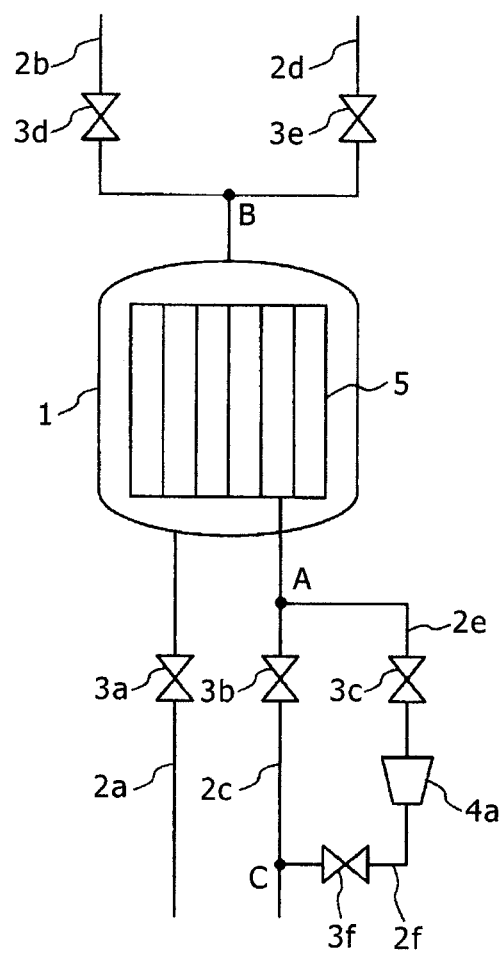
FIG. 2 is a view illustrating a configurational example of a $CO_2$ separation unit according to Example 2.

FIG. 2 is a view illustrating a configurational example of a $CO_2$ separation unit according to Example 2 of the invention. In FIG. 2, reference numerals identical with those in FIG. 1 show elements identical or in common with those of Example 1. For elements or configurations identical or in common with those of Example 1, description is to be omitted.

In the unit, a heat conduction pipe 5 is provided inside the capturing material container 1, and the $CO_2$ capturing material is heated by causing the steam-containing gas to flow into a heat conduction pipe 5 thereby heating the heat conduction pipe. The pipeline 2c introduces the steam-containing gas to the heat conduction pipe 5 provided inside the capturing material container 1. The pipeline 2e connects the heat conduction pipe 5 with a suction port of the compressor 4a.

In FIG. 2, the pipeline 2c and the pipeline 2e are joined or branched at a relay point A. That is, the pipeline 2c and the pipeline 2e have a pipeline provided between the relay point A and the heat conduction pipe 5 in common with each other. Exclusive pipelines may be provided to the respective pipeline 2c and the pipeline 2a between the relay point A and the heat conduction pipe 5.

When the $CO_2$ of the $CO_2$-containing gas is captured by the $CO_2$ capturing material in the unit, a $CO_2$-containing gas is introduced from the pipeline 2a by way of the valve 3a to the capturing material container 1 while opening the valve 3a and the valve 3d and closing the valve 3b, valve 3c, the valve 3e, and the valve 3f. The $CO_2$ capturing material filled in the capturing material container 1 captures $CO_2$ and removes $CO_2$ from the $CO_2$-containing gas. The gas from which $CO_2$ has been removed in the capturing material container 1 is discharged by way of the valve 3d to the pipeline 2b.

When $CO_2$ is desorbed from the $CO_2$ capturing material that has captured $CO_2$, the valve 3b and the valve 3e are opened, while valve 3a, the valve 3c, the valve 3d, and the valve 3f are closed. The $CO_2$ capturing material is heated by introducing the steam-containing gas from the pipeline 2c by way of the valve 3b to the heat conduction pipe 5 to heat the heat conduction pipe 5. The $CO_2$ capturing material heated by the heat conduction pipe 5 desorbs $CO_2$ in the inside of the capturing material container 1. The desorbed $CO_2$-containing gas containing $CO_2$ desorbed from the capturing material is discharged from the capturing material container 1 by way of the valve 3e to the pipeline 2d.

Condensed water remains in the inside of the heat conduction pipe 5 after introducing the steam-containing gas. Then, when the condensed water is reutilized as the steam-containing gas, the valve 3c and the valve 3f are opened, while the valve 3a, the valve 3b, the valve 3d, and the valve 3e are closed, the inside of the heat conduction pipe 5 is depressurized, and water in the inside is evaporated into steam. The evaporated steam is introduced from the pipeline 2e by way of the valve 3c into the compressor 4a where they are compressed, and heated and pressurized to a temperature and a pressure necessary for desorbing $CO_2$ from the $CO_2$ capturing material. The thus pressurized steam is introduced as a steam-containing gas by way of the pipeline 2f and the valve 3f to the pipeline 2c.

In the $CO_2$ separation unit of this example, since a portion of the used steam is reutilized, the amount of steam to be used can be decreased in the same manner as in Example 1. Further, since the steam and the $CO_2$ capturing material are not in direct contact with each other, this provides an advantage capable of preventing deterioration of the $CO_2$ capturing performance of the $CO_2$ capturing material.

Example 3

Figure 3:
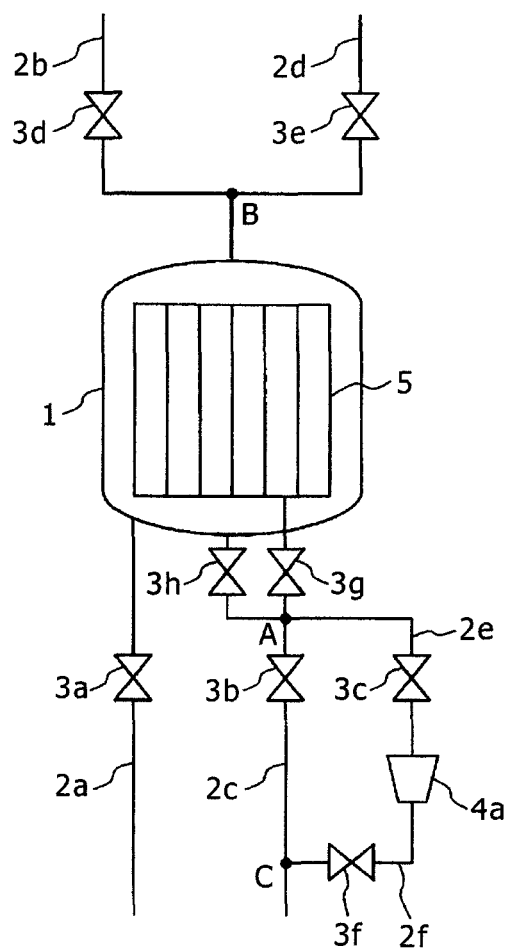
FIG. 3 is a view illustrating a configurational example of a $CO_2$ separation unit according to Example 3.

FIG. 3 is a view illustrating a configuration example of a $CO_2$ separation unit according to Example 3 of the invention. In FIG. 3, reference numerals identical with those in FIG. 1 and FIG. 2 show elements identical or in common with those in Example 1 and Example 2. For elements and configurations identical or in common with those in Example 1 and Example 2 description is to be omitted.

This unit has a capturing material container 1 filled with a $CO_2$ capturing material and a heat conduction pipe 5 provided inside the capturing material container 1. A pipeline 2c is branched into two ways at a relay point A, one of which allows a steam-containing gas to flow therethrough into the capturing material container 1 and the other one of which allows a steam-containing gas to flow therethrough into the heat conduction pipe 5. A pipeline 2e is branched into two ways at the relay point A, one of which connects the capturing material container 1 with the suction port of the compressor 4a and the other one of which connects the heat conduction pipe 5 with the suction port of the compressor 4a. In addition to a valve 3a to a valve 3f, a valve 3h intervenes between the relay point A and the capturing material container 1 and a valve 3g intervenes between the relay point A and the heat conduction pipe 5. The valve 3a to the valve 3h control the flow rate and the pressure of the gas.

In FIG. 3, the pipeline 2c and the pipeline 2e are joined or branched at the relay point A. That is, the pipeline 2c and the pipeline 2e have the pipeline provided between the relay point A and the capturing material container 1 and have the pipeline provided between the relay point A and the heat conduction pipe 5 in common with each other. Exclusive pipelines may be provided to the pipeline 2c and the pipeline 2e between the relay point A and the capturing material container 1 and between the relay point A and the heat conduction pipe 5 respectively.

When $CO_2$ in the $CO_2$-containing gas is captured by the $CO_2$ capturing material in this unit, the valve 3a and the valve 3d are opened, while the valve 3b, the valve 3c, the valve 3e, the valve 3f, the valve 3g, and the valve 3h are closed, and the $CO_2$-containing gas is introduced from the pipeline 2a by way of the valve 3a into the capturing material container 1. The $CO_2$ capturing material filled in the capturing material container 1 captures $CO_2$ and removes $CO_2$ from the $CO_2$-containing gas. The gas from which $CO_2$ has been removed in the capturing material container 1 is discharged by way of the valve 3d to the pipeline 2b.

When $CO_2$ is desorbed from the $CO_2$ capturing material that has captured $CO_2$, the valve 3b, the valve 3e, the valve 3g, and the valve 3h are opened, while the valve 3a, the valve 3c, the valve 3d and the valve 3f are closed. The $CO_2$ capturing material is heated by introducing the steam-containing gas from the pipeline 2c by way of the valve 3b and the valve 3h into the capturing material container 1, and heating the heat conduction pipe 5 by introducing the steam-containing gas from the pipeline 2c by way of the valve 3b and the valve 3g into the heat conduction pipe 5. The $CO_2$ capturing material heated by the steam-containing gas and the heat conduction pipe 5 desorbs $CO_2$ in the inside of the capturing material container 1. The desorbed $CO_2$-containing gas containing $CO_2$ desorbed from the $CO_2$ capturing material is discharged from the capturing material container 1 by way of the valve 3e to the pipeline 2d.

Condensed water remains in the inside of the capturing material container 1 and the inside of the heat conduction pipe 5 after introducing the steam-containing gas. Then, when the condensed water is reutilized as the steam-containing gas, the valve 3c, the valve 3f, the valve 3g, and the valve 3h are opened, while the valve 3a, the valve 3b, the valve 3d, and the valve 3e are closed, the inside of the capturing material container 1 and that of the heat conduction pipe 5 are depressurized to evaporate water in the inside into steam. The evaporated steam is introduced from the pipeline 2e by way of the valve 3h, valve 3g, and the valve 3c into the compressor 4a and compressed, and heated and pressurized to a temperature and a pressure necessary for desorbing $CO_2$ from the $CO_2$ capturing material. The thus compressed steam is introduced as a steam-containing gas by way of the pipeline 2f and the valve 3f to the pipeline 2c.

In the $CO_2$ separation unit according to this example, since a portion of the steam that has been used is reutilized, the amount of the steam to be used can be decreased in the same manner as in Example 1 and Example 2. Further, since the $CO_2$ capturing material is heated by direct contact of the steam with the $CO_2$ capturing material, in addition, is heated by the heated heat conduction pipe 5, this embodiment has an advantage that the heating speed is faster. The configuration of the $CO_2$ separation unit according to this example can be adopted depending on the kind of the $CO_2$ capturing material.

Example 4

Figure 4:
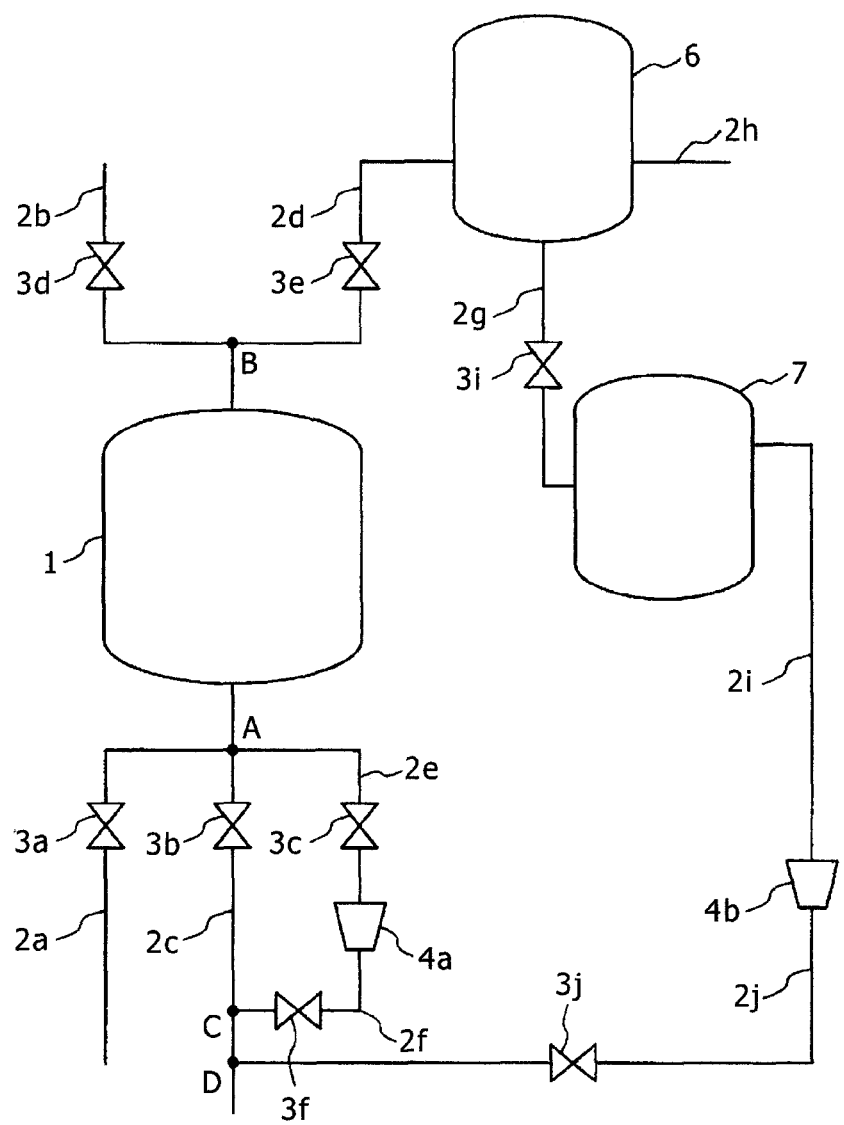
FIG. 4 is a view illustrating a configurational example of a $CO_2$ separation unit according to Example 4.

FIG. 4 is a view illustrating a configurational example of a $CO_2$ separation unit according to Example 4 of the invention.

In FIG. 4, reference signs identical with those in FIG. 1 show elements identical or in common with those in Example 1. For elements and configurations identical or in common with those in Example 1, description is to be omitted.

In the $CO_2$ separation unit illustrated in Example 1, the unit of this example further has a condenser 6 for condensing steam and removing them from the desorbed $CO_2$-containing gas flowing in the pipeline 2d, a pipeline 2g for allowing condensed water to be discharged therethrough from the condenser 6, a pipeline 2h for allowing a gas from which steam have been removed to be discharged from the condenser 6, a flasher container 7 for evaporating condensed water discharged from the condenser 6 by depressurization to generate steam, a compressor 4b for compressing the steam, a pipeline 2i for connecting the flasher container 7 with a suction port of the compressor 4b, a pipeline 2j for allowing the steam compressed by the compressor 4b to flow therethrough to the pipeline 2c, and a valve 3i and a valve 3j for controlling the flow rate and the pressure of the gas. The pipeline 2j is joined to the pipeline 2c at a relay point D. The valve 3i and the valve 3j intervene in the pipeline 2g and the pipeline 2j respectively.

The compressor 4b compresses the steam introduced from the pipeline 2i and heats and pressurizes the steam to a temperature and a pressure necessary for desorbing $CO_2$ from the $CO_2$ capturing material.

When $CO_2$ in the $CO_2$-containing gas is captured by the $CO_2$ capturing material in the unit, the valve 3a and the valve 3d are opened, while the valve 3b, the valve 3c, the valve 3e, the valve 3f, the valve 3g, and the valve 3h are closed, and the $CO_2$-containing gas is introduced from the pipeline 2a by way of the valve 3a into the capturing material container 1. The $CO_2$ capturing material filled in the capturing container 1 captures $CO_2$ and removes $CO_2$ from the $CO_2$-containing gas. The gas from which $CO_2$ has been removed in the capturing material container 1 is discharged by way of the valve 3d to the pipeline 2b.

When $CO_2$ is desorbed from the $CO_2$ capturing material that has captured $CO_2$, the valve 3b, valve 3e, the valve 3i, and the valve 3j are opened, while the valve 3a, the valve 3c, the valve 3d, and the valve 3f are closed. A steam-containing gas is introduced from the pipeline 2c by way of the valve 3b into the capturing material container 1 to heat the $CO_2$ capturing material. The $CO_2$ capturing material heated by the steam-containing gas desorbs $CO_2$ in the inside of the capturing material container 1. The desorbed $CO_2$-containing gas containing $CO_2$ desorbed from the $CO_2$ capturing material is discharged from the capturing material container 1 by way of the valve 3e to the pipeline 2d.

The desorbed $CO_2$-containing gas discharged to the pipeline 2d is cooled by the condenser 6 for removing steam. The gas from which the steam has been removed in the condenser 6 is discharged to the pipeline 2h. Water condensed in the condenser 6 is sent by way of a pipeline 2g and a valve 3i to the flasher container 7. A portion of condensed water is evaporated into steam by depressurizing the inside of the flasher container 7. The evaporated steam is introduced from the pipeline 2i to the compressor 4b and are compressed and heated and pressurized to a temperature and a pressure necessary for desorbing $CO_2$ from the $CO_2$ capturing material. The thus compressed steam is introduced as a steam-containing gas by way of the pipeline 2j and the valve 3j to the pipeline 2c.

Condensed water remains in the inside of the capturing material container 1 after introduction of the steam-containing gas. Then, when the condensed water is reutilized as the steam-containing gas, the valve 3c and the valve 3f are opened, while the valve 3a, the valve 3b, the valve 3d, the valve 3e, the valve 3i, and the valve 3j are closed, and the inside of the capturing material container 1 is depressurized to evaporate water remaining thereinside into steam. The evaporated steam is introduced from the pipeline 2e by way of the valve 3c into the compressor 4a and compressed, and heated and pressurized to a temperature and a pressure necessary for desorbing $CO_2$ from the $CO_2$ capturing material. The thus compressed steam is introduced, as a steam-containing gas by way of the pipeline 2f and the valve 3f into the pipeline 2c.

In the $CO_2$ separation unit according to this example, since not only the steam obtained from the condensed water remaining in the inside of the capturing material container 1 but also the steam contained in the desorbed $CO_2$-containing gas are reutilized, the amount of the used steam can be further decreased than that in the $CO_2$ separation unit according to Examples 1 to 3.

Comparative Example 1

Figure 5:
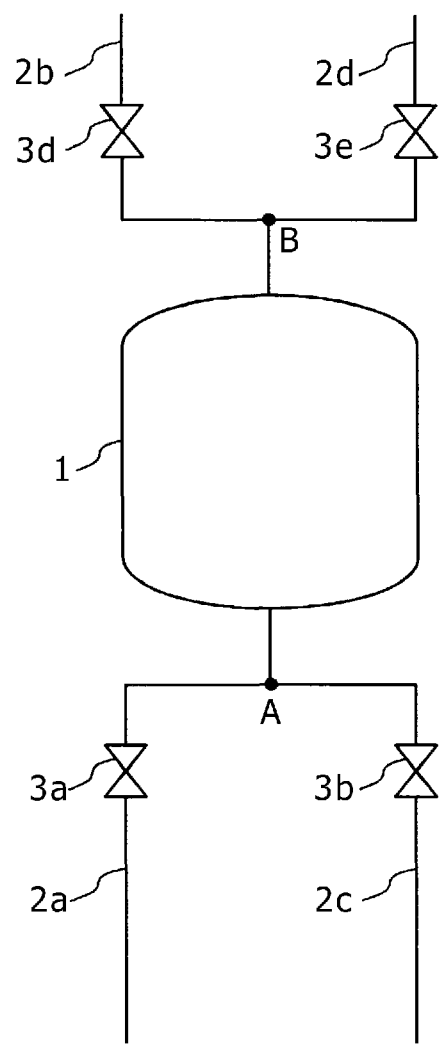
FIG. 5 is a view illustrating a configurational example of an existent $CO_2$ separation unit.

FIG. 5 is a view illustrating a configurational example of an existent $CO_2$ separation unit. The existent $CO_2$ separation unit has a capturing material container 1 in which a $CO_2$ capturing material is filled, a pipeline 2a for allowing a $CO_2$-containing gas to flow therethrough into the capturing material container 1, a pipeline 2b for allowing a gas from which $CO_2$ has been removed to be discharged therethrough from the capturing material container 1, a pipeline 2c for allowing the steam-containing gas to flow therethrough into the capturing material container 1, a pipeline 2d for allowing a desorbed $CO_2$-containing gas desorbed from the $CO_2$ capturing material, while the steam-containing gas flows in the container, to be discharged from the capturing material container 1, and a valve 3a, a valve 3b, a valve 3d and a valve 3e for controlling the flow rate and the pressure of a gas. The valve 3a, the valve 3b, the valve 3d, and the valve 3e intervene respectively to the pipeline 2a, the pipeline 2c, the pipeline 2b, and the pipeline 2d.

When the $CO_2$ of the $CO_2$-containing gas is captured by the $CO_2$ capturing material, the valve 3a and the valve 3d are opened, while the valve 3b and the valve 3e are closed and a $CO_2$-containing gas is introduced from the pipeline 2a by way of the valve 3a into the capturing material container 1. The $CO_2$ capturing material filled in the capturing material container 1 captures $CO_2$ and removes $CO_2$ from the $CO_2$-containing gas. The gas from which $CO_2$ has been removed in the capturing material container 1 is discharged by way of the valve 3d to the pipeline 2b.

When $CO_2$ is desorbed from the $CO_2$ capturing material that has captured $CO_2$, the valve 3b and the valve 3e are opened, while the valve 3a and the valve 3d are closed. A steam-containing gas is introduced from the pipeline 2c by way of the valve 3b into the capturing materials container 1 to heat the $CO_2$ capturing material. The $CO_2$ capturing material heated by the steam-containing gas desorbs $CO_2$ in the inside of the capturing material container 1. The desorbed $CO_2$-containing gas containing $CO_2$ desorbed from the $CO_2$ capturing material is discharged from the capturing material container 1 by way of the valve 3e to the pipeline 2d.

Example 5

Figure 6:
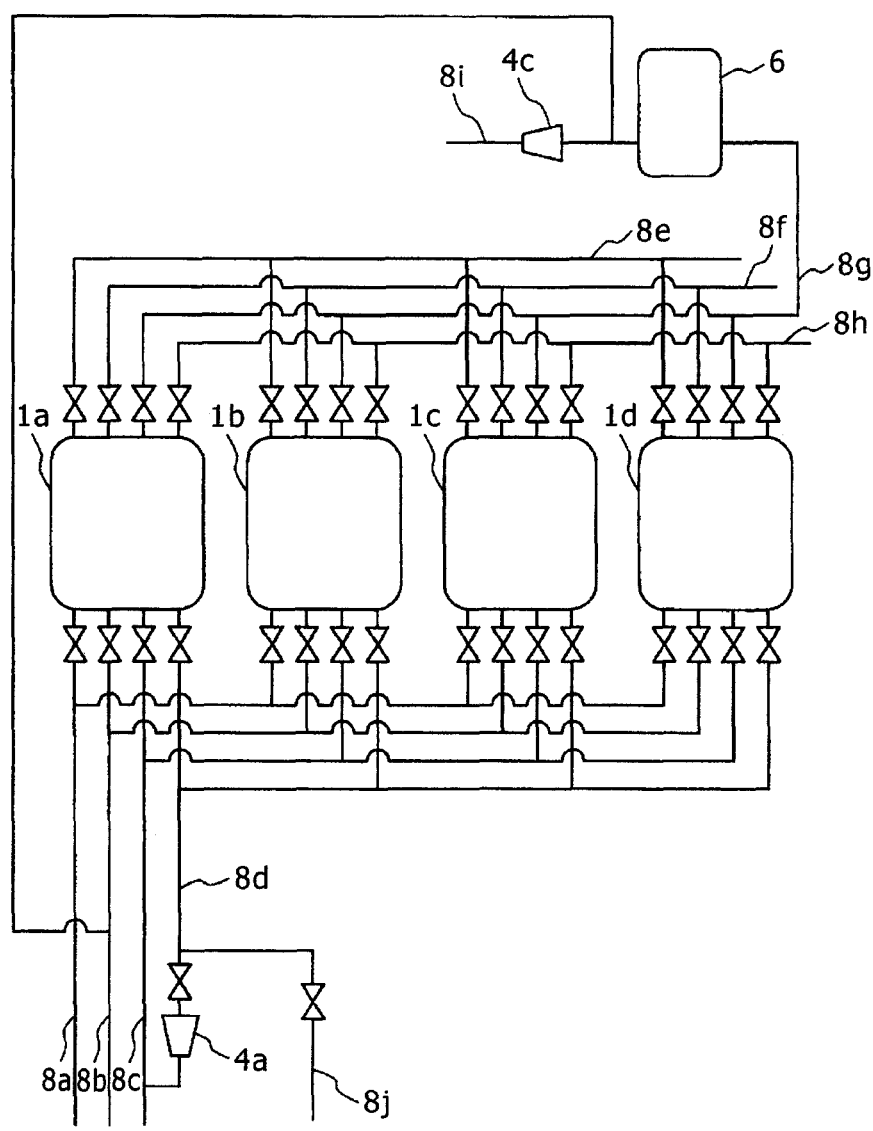
FIG. 6 is a view illustrating a configurational example of a $CO_2$ separation unit for recovering $CO_2$ using a plurality of capturing material containers.

FIG. 6 is a view illustrating a configurational example of a $CO_2$ separation unit for recovering $CO_2$ by using a plurality of capturing material containers. This unit has capturing material containers 1a to 1d in each of which a $CO_2$ capturing material is filled, a pipeline 8a for allowing a $CO_2$-containing gas to flow therethrough into the capturing material containers 1a to 1d, a pipeline 8b for allowing a purging $CO_2$-containing gas to flow therethrough into the capturing material containers 1a to 1d, a pipeline 8c for allowing a steam-containing gas to flow therethrough into the capturing material containers 1a to 1d, a pipeline 8d for allowing an atmospheric air (dry air) to flow therethrough into the capturing material containers 1a to 1d or depressurizing the inside of the capturing material containers 1a to 1d, a pipeline 8e for allowing a gas from which $CO_2$ has been removed to be discharged therethrough from the capturing material containers 1a to 1d, a pipeline 8f for allowing an impurity gas ($N_2$, $O_2$, etc. remaining in the inside of the capturing material containers 1a to 1d) to be discharged therethrough from the capturing material containers 1a to 1d, a pipeline 8g for allowing a gas mixture of $CO_2$ and steam to be discharged therethrough from the capturing material containers 1a to 1d, and a pipeline 8h for allowing the atmospheric air (dry air) used for cooling to be discharged therethrough from the capturing material containers 1a to 1d. The unit further comprises a condenser 6 for removing steam from the gas mixture of $CO_2$ and the steam, a compressor 4c for liquefying and compressing $CO_2$, a pipeline 8i for allowing a liquefied and compressed $CO_2$ to flow therethrough, a compressor 4a for compressing the steam, and a pipeline 8j for allowing the atmospheric air (dry air) to flow therethrough. In the pipeline 8a to the pipeline 8j, flow in the pipelines can be switched by turning on and off the valves. In FIG. 6, not all valves necessary for the unit are illustrated.

The condenser 6 is connected to the pipeline 8b, the pipeline 8g, and the compressor 4c. The compressor 4c is connected to the pipeline 8i for allowing the liquefied and compressed $CO_2$ to flow therethrough.

The pipeline 8d is connected to the pipeline 8j for allowing dry air to flow therethrough and to the compressor 4a. The compressor 4a is connected to the pipeline 8c.

Then, a method of recovering $CO_2$ by using the unit is shown. The capturing material containers 1a to 1d recover $CO_2$ by repeating six steps of a capturing step, a purging step, a regeneration step, a depressurization step, a compression step, and a cooling step as one cycle.

In the capturing step, the valves connected to the pipeline 8a and the pipeline 8e are opened, a $CO_2$-containing gas is introduced into the capturing material containers 1a to 1d, $CO_2$ is captured by the capturing material and the gas from which $CO_2$ has been removed is discharged from the capturing material containers 1a to 1d.

In the purging step, valves connected to the pipeline 8b and the pipeline 8f are opened, a $CO_2$-containing gas for purging is made to flow to the capturing material containers 1a to 1d and an impurity gas ($N_2$, $O_2$, etc. remaining in the inside of the capturing material containers 1a to 1d) is discharged from the capturing material containers 1a to 1d.

In the regeneration step, valves connected to the pipeline 8c and the pipeline 8g are opened, the steam-containing gas is made to flow into the capturing material containers 1a to 1d, $CO_2$ is desorbed to regenerate the $CO_2$ capturing material and a gas mixture of $CO_2$ and steam is discharged from the capturing material containers 1a to 1d.

The depressurization step and the compression step are performed simultaneously. In the depressurization step and the compression step, the valve connected to the pipeline 8d is opened, the inside of the capturing material containers 1a to 1d are depressurized, and the generated steam is compressed by the compressor 4a. A valve disposed between the compressor 4a and the pipeline 8c is opened and steam compressed by the compressor 4a is introduced to the pipeline 6c.

In the cooling step, valves connected to the pipeline 8d, the pipeline 8h, and the pipeline 8j are opened, atmospheric air (dry air) is made to flow, and the $CO_2$ capturing material in the inside of the capturing material containers 1a to 1d is cooled, and the atmospheric air used for cooling is discharged from the capturing material containers 1a to 1d.

This example shows a case in which the capturing step is performed by the capturing material container 1a, the purging step by the capturing material container 1b, the regeneration step by the capturing material container 1c, and the cooling step after the depressurizing step and the compression step by the capturing material container 1d respectively. A cerium oxide is used as the $CO_2$ capturing material and calculation for the amount of the steam shown below was performed assuming an apparent density as 1400 kg/m³, a specific calorie as 385 J/kg·K, a $CO_2$ capturing energy as 60 kJ/mol·$CO_2$, and a critical $CO_2$ capturing limit as 500 mmol/kg. Further, the height of each of the capturing material containers 1a to 1d was 2.0 m and the cross sectional area of each of the capturing material containers 1a to 1d was 1.0 m². The $CO_2$ capturing material in the inside of the capturing material container 1a was cooled to 50° C. by the cooling step before the capturing step.

In the capturing step, a $CO_2$-containing gas at a pressure of 1.0 atm and at a temperature of 50° C. was made to flow by 7500 mol in total by way of the pipeline 8a into the capturing material container 1a. The $CO_2$-containing gas contains 73 vol % of $N_2$, 14 vol of $CO_2$, 3 vol of $O_2$, and 10 vol % of steam. $CO_2$ was captured and removed from the $CO_2$-containing gas by contact between the $CO_2$ capturing material in the inside of the capturing material container 1a and the $CO_2$-containing gas. The gas after removing the $CO_2$ was discharged by way of the pipeline 8e from the capturing material container 1a.

In the purging step, a $CO_2$ gas at a temperature of 25° C., at a purity of 100 vol % and at a pressure of 5.0 atm was caused to flow by 430 mol by way of a pipeline 8b into the capturing material container 1b. Gas other than $CO_2$ (impurity gas) remaining in the inside of the capturing material container 1b after the capturing step (such as $N_2$ and $O_2$) was discharged by the $CO_2$ gas by way of the pipeline 8f from the capturing material container 1b.

In the regeneration step, steam at a pressure of 5.0 atm, and at a temperature of 155° C. was made to flow by 4900 mol by way of the pipeline 8c into the capturing material container 1c. By heating the $CO_2$ capturing material in the inside of the capturing material container 1c to a temperature of 100 to 155° C. by the flow of the steam, $CO_2$ was desorbed from the $CO_2$ capturing material. $CO_2$ and steam in the inside of the capturing material container 1c were discharged by way of the pipeline 8g from the capturing material container 1c. Then, discharged $CO_2$ and steam were cooled to 25° C. in the condenser 6 and the steam was removed by condensation. Among the $CO_2$-containing gas at a temperature of 25° C., at a concentration of 100 vol %, and at a pressure of 5.0 atm discharged from the condenser 6, a portion of $CO_2$ was drawn as $CO_2$ to be used for the purging step and made to flow to the pipeline 8b. Remaining $CO_2$ was sent to the compressor 4c, liquefied and compressed and then discharged by way of the pipeline 8i and transported to the outside of this unit.

In the depressurization step, the capturing material container 1d was connected with the compressor 4a by way of the pipeline 8b, and the inside of the capturing material container 1d was depressurized from 5.0 atm to 1.0 atm. As the result of calculation for the amount of the steam evaporated in the pressure reducing step, it was 1624 mol.

In the compression step, steam generated in the depressurization step and discharged from the capturing material container 1d was compressed to 5.0 atm by the compressor 4a and made to flow to the pipeline 8c. Thus, 1624 mol of steam generated in the depressurization step could be reutilized.

Then, in the cooling step, atmospheric air (dry air) for cooling at a temperature of 25° C. was made to flow by way of the pipeline 8j and the pipeline 8d into the capturing material container 1d. The atmospheric air heated by heat exchange in the capturing material container 1d was discharged from the pipeline 8h.

Comparative Example 2

Figure 7:
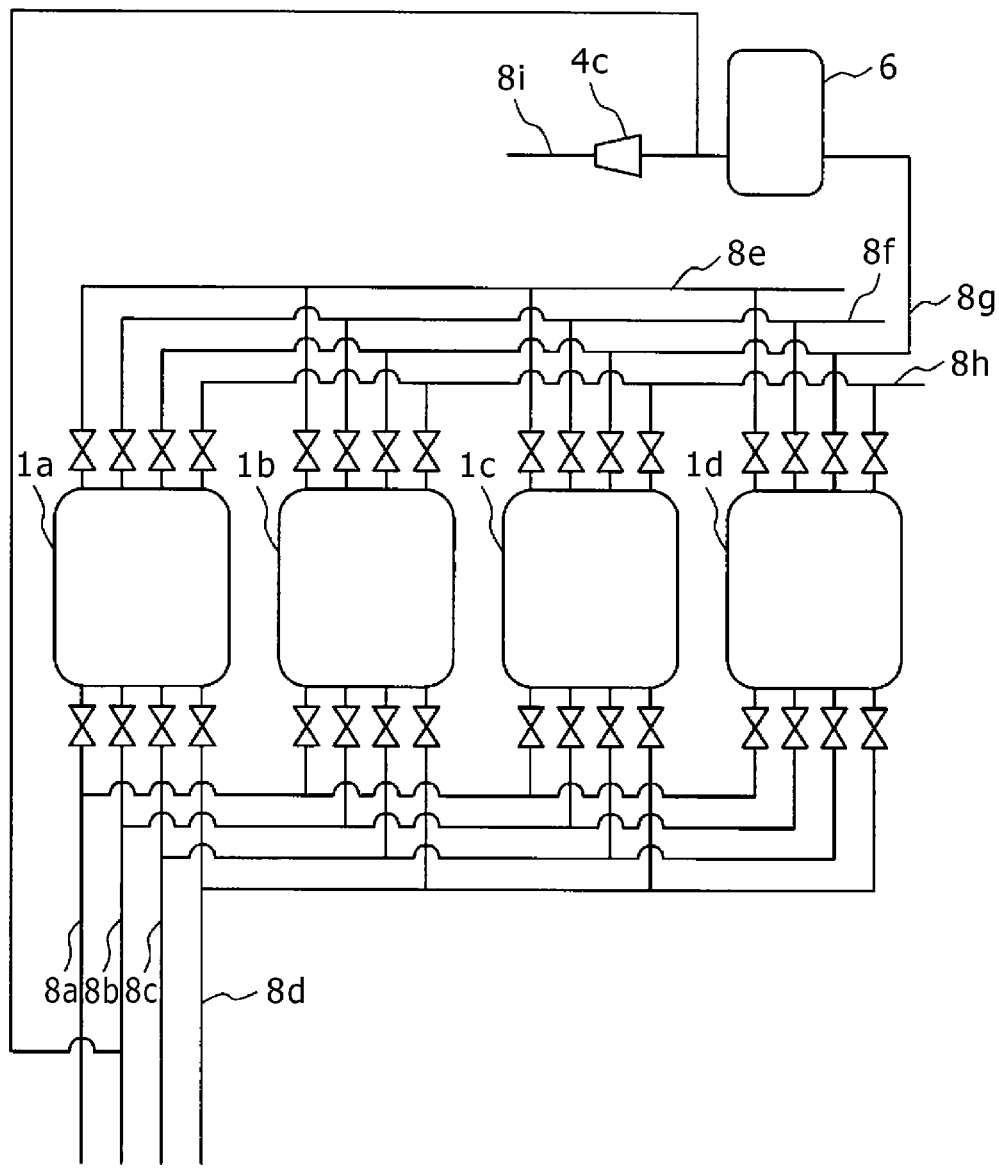
FIG. 7 is a view illustrating a configurational example of an existent $CO_2$ separation unit for recovering $CO_2$ using a plurality of capturing material containers.

FIG. 7 is a view illustrating a configurational example of an existent $CO_2$ separation unit for recovering $CO_2$ by using a plurality of capturing material containers. This unit has capturing material containers 1a to 1d in each of which a $CO_2$ capturing material is filled, a pipeline 8a for allowing a $CO_2$-containing gas to flow therethrough into capturing material containers 1a to 1d, a pipeline 8b for allowing a $CO_2$-containing gas for purging to flow therethrough into capturing material containers 1a to 1d, a pipeline 8c for allowing the steam-containing gas to flow therethrough into the capturing material containers 1a to 1d, a pipeline 8d for allowing an atmospheric air (dry air) to flow therethrough into the pipeline capturing containers 1a to 1d, a pipeline 8e for allowing a gas from which $CO_2$ has been removed to be discharged therethrough from the capturing material containers 1a to 1d, a pipeline 8f for allowing an impurity gas ($N_2$, $O_2$, etc. remaining inside of the capturing material containers 1a to 1d) to be discharged therethrough from the capturing material containers 1a to 1d, a pipeline 8g for allowing a gas mixture of $CO_2$ and steam to be discharged therethrough from the capturing material containers 1a to 1d, and a pipeline 8h for allowing the atmospheric air (dry air) that has been used for cooling to be discharged therethrough from the capturing material containers 1a to 1d. The unit further has a condenser 6 for removing steam from the gas mixture of $CO_2$ and steam, a compressor 4c for liquefying and compressing $CO_2$, and a pipeline 8i for flowing liquefied and compressed $CO_2$. The pipeline 8a to the pipeline 8i can switch the flow in the pipelines by the on-off of the valves. In FIG. 7, not all valves necessary for the unit are illustrated.

The condenser 6 is connected to the pipeline 8b, the pipeline 8g, and the compressor 4c. The compressor 4c is connected to the pipeline 8i for allowing the liquefied and compressed $CO_2$ to flow therethrough.

Then, a method of recovering $CO_2$ by using this unit is shown. The capturing material containers 1a to 1d recover $CO_2$ by repeating four steps of a capturing step, a purging step, a regeneration step, and a cooling step as one cycle.

In the capturing step, valves connected to the pipeline 8a and the pipeline 8e are opened, a $CO_2$-containing gas is introduced to the capturing material containers 1a to 1d, $CO_2$ is captured by the $CO_2$ capturing material, and a gas from which $CO_2$ has been removed is discharged from the capturing material containers 1a to 1d.

In the purging step, the valves connected to the pipeline 8b and the pipeline 8f are opened, a $CO_2$-containing gas for purging is made to flow into the capturing material containers 1a to 1d, and an impurity gas ($N_2$, $O_2$, etc. remaining in the capturing material containers 1a to 1d) is discharged from the capturing material containers 1a to 1d.

In the regeneration step, the valves connected to the pipeline 8c and the pipeline 8g are opened, a steam-containing gas is made to flow into the capturing material containers 1a to 1d, to desorb $CO_2$ and regenerate the $CO_2$ capturing material, and a gas mixture of $CO_2$ and steam is discharged from the capturing material containers 1a to 1d.

In the cooling step, the valves connected to the pipeline 8d and the pipeline 8c are opened, an atmospheric air (dry air) is made to flow to cool the $CO_2$ capturing material inside the capturing material containers 1a to 1d, and an atmospheric air used for cooling is discharged from the capturing material containers 1a to 1d.

This comparative example shows an example in which the capturing step is performed by the capturing material container 1a, a purging step by the capturing material container 1b, a regeneration step by the capturing material container 1c, and the cooling step by the capturing material container 1d respectively. The same $CO_2$ capturing material as that in Example 5 was used. Also the size of the capturing material containers 1a to 1d is identical with that of Example 5. Further, the $CO_2$ capturing material in the inside of the capturing material container 1a was cooled to 50° C. by the cooling step before the capturing step.

In the capturing step, a $CO_2$-containing gas at a pressure of 1.0 atm and at a temperature of 50° C. was made to flow by 7500 mol in total by way of the pipeline 8a into the capturing material 1a. The $CO_2$-containing gas contains 73 vol % of $N_2$, 14 vol % of $CO_2$, 3 vol % of $O_2$, and 10 vol % of steam. $CO_2$ is captured and removed from the $CO_2$-containing gas by the contact between the $CO_2$ capturing material inside the capturing material container 1a and the $CO_2$-containing gas. The gas from which $CO_2$ had been removed was discharged by way of the pipeline 8e from the capturing material container 1a.

In the purging step, a $CO_2$ gas at a temperature of 25° C., at a purity of 100 vol %, and at a pressure of 5.0 atm was caused to flow by 430 mol by way of the pipeline 8b into the capturing material container 1b. A gas other than $CO_2$ (impurity gas) remaining in the inside of the capturing material container 1b after the capturing step for $N_2$ and $O_2$ was discharged by the $CO_2$ gas by way of the pipeline 8f from the capturing material container 1b.

In the regeneration step, steam at a pressure of 5.0 atm and at a temperature of 155° C. was made to flow by 4900 mol by way of the pipeline 8c into the capturing material container 1c. $CO_2$ was desorbed from the $CO_2$ capturing material by heating the $CO_2$ capturing material in the inside of the capturing material container 1c to a temperature of 100 to 155° C. by the flow of the steam. $CO_2$ and steam in the inside of the capturing material container is were discharged by way of the pipeline 8g from the capturing material container 1c. Then, discharged $CO_2$ and steam were cooled to 25° C. by the condenser 6, and the steam was condensed and removed. Among the $CO_2$ containing gas discharged from the condenser 6 at a temperature of 25° C., at a concentration of 100 vol %, and at a pressure of 5.0 atm, a portion of $CO_2$ is withdrawn as $CO_2$ used for the purging step and made to flow to the pipeline 8b. The remaining $CO_2$ was sent to the compressor 4c and liquefied and compressed and, subsequently, discharged by way of the pipeline 8i and transported to the outside of the unit.

In the cooling step, a cooling atmosphere (dry air) at a temperature of 25° C. was made to flow by way of the pipeline 8d into the capturing material container 1d. Atmospheric air heated by heat exchange in the capturing material container 1d was discharged from the pipeline 8h.

Figure 8:
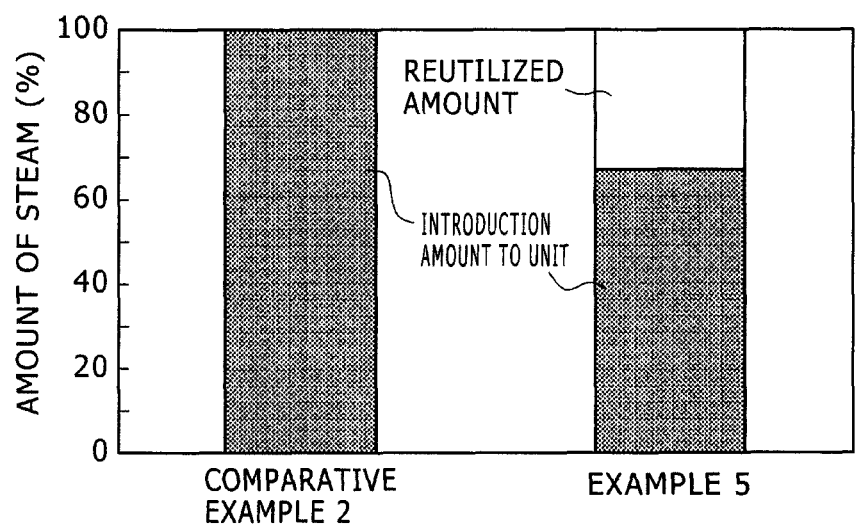
FIG. 8 is a graph comparing the amount of steam used between Comparative Example 2 and Example 5.

FIG. 8 is a graph for comparing the amount of used steam between the Comparative Example 2 and Example 5. Both in Comparative Example 2 and Example 5, 4900 mol of steam was made to flow in the regeneration step. However, 1624 mol of steam could be reutilized in Example 5. Accordingly, the amount of steam introduced into the $CO_2$ separation unit may be decreased to 3276 mol (=4,900 mol−1624 mol). That is, the amount of steam introduced into the $CO_2$ separation unit was 67% of Comparative Example 2 and it can be seen that the amount of used steam can be decreased.

Example 6

Figure 9:
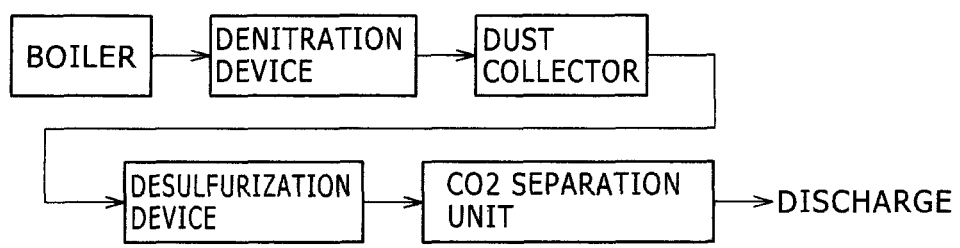
FIG. 9 is a flow showing steps of $CO_2$ separation and recovery from a boiler exhaust gas, using the $CO_2$ separation unit according to the invention.

FIG. 9 is a flow illustrating the steps of $CO_2$ separation and recovery from a boiler exhaust gas by using the $CO_2$ separation unit according to the invention. A denitration device, a dust collector, a desulfurization device, and the $CO_2$ separation unit according to the invention are installed in a boiler exhaust gas flow channel. After capturing $CO_2$ by the $CO_2$ separation unit, an exhaust gas is discharged to an atmospheric air. By installing the $CO_2$ separation unit to the downstream of the denitrating device, the dust collector, and the desulfurization device, the amount of $SO_x$ and $NO_x$ flowing into the $CO_2$ separation unit can be decreased, and poisoning of the $CO_2$ capturing material by such gases can be suppressed.

LIST OF REFERENCE SIGNS 1, 1a to 1d capturing material container
2a to 2j pipeline
3a to 3j valve
4a to 4c compressor
5 heat conduction pipe
6 condenser
7 flasher container
8a to 8j pipeline

The invention claimed is:

1. A $CO_2$ separation unit for recovering $CO_2$ from a $CO_2$ containing gas, the unit comprising:
   a capturing material container having a $CO_2$ capturing material for capturing $CO_2$, wherein the capturing material container has a heat conduction pipe thereinside;
   a first pipeline for allowing the $CO_2$-containing gas to flow therethrough into the capturing material container;
   a second pipeline for allowing a gas from which $CO_2$ has been removed by the $CO_2$ capturing material to be discharged therethrough from the capturing material container;
   a third pipeline for introducing a steam-containing gas to the inside of the capturing material container, wherein the third pipeline is branched into two ways, one of the ways allowing the steam-containing gas to flow therethrough into the heat conduction pipe, the other allowing the space inside the third pipeline and the space inside the capturing material container to connect with each other and allowing the steam-containing gas and the $CO_2$ capturing material to be in direct contact with each other; and
   a fourth pipeline for allowing a desorbed $CO_2$-containing gas desorbed from the $CO_2$ capturing material, while the steam-containing gas flows in the container, to be discharged therethrough from the capturing material container,
   the unit further comprising:
   a compressor for compressing steam,
   a fifth pipeline for connecting the capturing material container with a suction port of the compressor, wherein the fifth pipeline is branched into two ways, one of the ways connecting the heat conduction pipe with the suction port of the compressor, the other connecting the capturing material container with the suction port of the container, and
   a sixth pipeline for connecting a discharge port of the compressor with the third pipeline.

2. The $CO_2$ separation unit according to claim 1, wherein the compressor compresses steam generated by depressurizing the inside of the capturing material container, and the steam compressed by the compressor are introduced through the sixth pipeline to the third pipeline and caused to flow into the capturing material container.

3. The $CO_2$ separation unit according to claim 1, wherein the space inside the third pipeline and the space inside the capturing material container connect with each other and the steam-containing gas and the $CO_2$ capturing material can be brought into direct contact with each other.

4. The $CO_2$ separation unit according to claim 1, wherein the capturing material container has a heat conduction pipe thereinside,
   the third pipeline allows the steam-containing gas to flow therethrough into the heat conduction pipe, and
   the fifth pipeline connects the heat conduction pipe with the suction port of the compressor.

5. The $CO_2$ separation unit according to claim 4, wherein the compressor compresses steam generated by depressurizing the inside of the heat conduction pipe, and
   the steam compressed by the compressor is introduced through the sixth pipeline into the third pipeline and caused to flow into the capturing material container.

6. The $CO_2$ separation unit according to claim 1, wherein the unit further comprises:
   a condenser connected to the fourth pipeline for condensing steam from the desorbed $CO_2$-containing gas,
   a seventh pipeline for allowing the condensed water to be discharged therethrough from the condenser,
   a flasher container connected to the seventh pipeline for depressurizing the condensed water to generate steam,
   a second compressor for compressing the steam,
   an eighth pipeline for connecting the flasher container with a suction port of the second compressor, and
   a ninth pipeline for connecting a discharge port of the second compressor with the third pipeline.

7. The $CO_2$ separation unit according to claim 6, wherein the second compressor compresses the steam generated in the flasher container, and
   the steam compressed by the second compressor is introduced through the ninth pipeline to the third pipeline and caused to flow into the capturing material container.

* * * * *